(12) United States Patent
Staab (10) Patent No.: US 11,595,411 B2
(45) Date of Patent: Feb. 28, 2023

(54) ADAPTIVE, MULTI-LAYER ENTERPRISE DATA PROTECTION AND RESILIENCY PLATFORM

(71) Applicant: Raytheon Company, Waltham, MA (US)

(72) Inventor: Torsten Staab, Bristow, VA (US)

(73) Assignee: Raytheon Company, Waltham, MA (US)

(*) Notice: Subject to any disclaimer, the term of this patent is extended or adjusted under 35 U.S.C. 154(b) by 305 days.

(21) Appl. No.: 16/832,192

(22) Filed: Mar. 27, 2020

(65) Prior Publication Data

US 2020/0314123 A1    Oct. 1, 2020

Related U.S. Application Data

(60) Provisional application No. 62/827,441, filed on Apr. 1, 2019.

(51) Int. Cl.
*H04L 9/40* (2022.01)
*H04L 9/06* (2006.01)
*H04L 9/32* (2006.01)

(52) U.S. Cl.
CPC ........ *H04L 63/1416* (2013.01); *H04L 9/0637* (2013.01); *H04L 9/321* (2013.01)

(58) Field of Classification Search
CPC . H04L 63/1416; H04L 63/1441; H04L 63/20; H04L 9/0637; H04L 9/321;
(Continued)

(56) References Cited

U.S. PATENT DOCUMENTS 6,473,857 B1    10/2002    Panas et al.
7,260,555 B2    8/2007    Rossmann et al.
(Continued)

FOREIGN PATENT DOCUMENTS

EP    1 764 721 A2    3/2007
EP    3 422 661 A1    1/2019
(Continued)

OTHER PUBLICATIONS

U.S. Appl. No. 16/722,142, filed Dec. 20, 2019, Hird et al.
(Continued)

*Primary Examiner* — Daniel B Potratz
*Assistant Examiner* — Matthias Habtegeorgis
(74) *Attorney, Agent, or Firm* — Daly, Crowley, Mofford & Durkee, LLP (57) ABSTRACT

A system for data protection includes a first computing device comprising a security module; and a storage device coupled to the first computing device via a network interface. The security module comprises at least one of Software Root of Trust (SRoT) and Hardware Root of Trust (HRoT). The security module is further configured to: establish a trust channel between the first computing device and the storage device or storage service; monitor the first computing device and the storage device; create and enforce multi-dimensional data access control by tightly binding data access and permissions to authorized computing devices, users, applications, system services, networks, locations, and access time windows; and take over control of the storage device or storage service in response to a security risk to the system.

14 Claims, 4 Drawing Sheets

(58) Field of Classification Search
CPC ........... H04L 9/0897; H04L 9/3234; G06F 2009/45575; G06F 2009/45579; G06F 2009/45583; G06F 21/52; G06F 21/53; G06F 21/554; G06F 21/575; G06F 21/71; G06F 21/74; G06F 21/78; G06F 2221/033; G06F 9/4401; G06F 9/45533; G06F 9/45558

See application file for complete search history.

(56) References Cited

U.S. PATENT DOCUMENTS

| | | |
|---|---|---|
| 9,235,709 B2 | 1/2016 | Kim et al. |
| 9,251,343 B1 | 2/2016 | Vincent et al. |
| 9,319,380 B2 | 4/2016 | Lukacs et al. |
| 9,509,587 B1 | 11/2016 | Marquardt et al. |
| 9,600,291 B1 | 3/2017 | Atsatt |
| 9,626,512 B1 | 4/2017 | Brandwine et al. |
| 10,027,717 B2 | 7/2018 | Ben-Shalom et al. |
| 2004/0003262 A1 | 1/2004 | England et al. |
| 2004/0177260 A1 | 9/2004 | Gilfix et al. |
| 2005/0138409 A1 | 6/2005 | Sheriff et al. |
| 2006/0015748 A1 | 1/2006 | Goto et al. |
| 2006/0026417 A1 | 2/2006 | Furusawa et al. |
| 2007/0276878 A1 | 11/2007 | Zheng et al. |
| 2008/0307488 A1 | 12/2008 | Hammond, II et al. |
| 2009/0204964 A1 | 8/2009 | Foley et al. |
| 2010/0070743 A1 | 3/2010 | Grigor et al. |
| 2010/0250796 A1 | 9/2010 | Jevans et al. |
| 2011/0302638 A1 | 12/2011 | Cha et al. |
| 2014/0068275 A1 | 3/2014 | Swanson et al. |
| 2014/0298026 A1 | 10/2014 | Isozaki et al. |
| 2015/0012737 A1 | 1/2015 | Newell |
| 2016/0125187 A1 | 5/2016 | Oxford |
| 2016/0147996 A1 | 5/2016 | Martinez |
| 2016/0162669 A1 | 6/2016 | Mikhailov et al. |
| 2016/0378996 A1 | 12/2016 | Smith et al. |
| 2017/0104770 A1 | 4/2017 | Jreij et al. |
| 2017/0116440 A1* | 4/2017 | Huang ............... G06F 21/6218 |
| 2017/0132417 A1 | 5/2017 | Martinez |
| 2017/0180318 A1 | 6/2017 | Lutas et al. |
| 2017/0206034 A1 | 7/2017 | Fetik |
| 2017/0213053 A1 | 7/2017 | Areno et al. |
| 2017/0364685 A1 | 12/2017 | Shah et al. |
| 2018/0004953 A1* | 1/2018 | Smith, II ............... G06F 21/57 |
| 2018/0034793 A1 | 2/2018 | Kibalo et al. |
| 2018/0089425 A1 | 3/2018 | Trikalinou |
| 2018/0109538 A1* | 4/2018 | Kumar ................. H04L 63/08 |
| 2018/0165448 A1 | 6/2018 | Nightingale et al. |
| 2018/0255077 A1 | 9/2018 | Paine |
| 2018/0260009 A1 | 9/2018 | Roeder |
| 2018/0278418 A1 | 9/2018 | Chang et al. |
| 2018/0285839 A1* | 10/2018 | Yang ................. G06Q 20/3829 |
| 2018/0365425 A1 | 12/2018 | Packer Ali et al. |
| 2019/0042516 A1 | 2/2019 | Browning et al. |
| 2019/0050604 A1 | 2/2019 | Weber et al. |
| 2019/0073478 A1 | 3/2019 | Khessib et al. |
| 2019/0253417 A1* | 8/2019 | Kim ...................... G06F 21/57 |
| 2019/0266331 A1 | 8/2019 | Sanchez Diaz et al. |
| 2019/0305938 A1* | 10/2019 | Sandberg-Maitland ................. H04L 9/3239 |
| 2019/0311126 A1 | 10/2019 | Areno et al. |
| 2019/0311147 A1* | 10/2019 | Gollogly ............... H04L 63/105 |
| 2019/0334919 A1* | 10/2019 | Le Roy .................... G06F 9/468 |
| 2019/0386974 A1* | 12/2019 | Fernando ............ H04W 12/084 |
| 2020/0082091 A1 | 3/2020 | Areno et al. |
| 2020/0082092 A1 | 3/2020 | Areno et al. |
| 2020/0084229 A1 | 3/2020 | Areno et al. |
| 2020/0125772 A1* | 4/2020 | Volos ..................... G06F 21/602 |
| 2020/0145409 A1* | 5/2020 | Pochuev ............... H04L 63/061 |
| 2020/0160947 A1* | 5/2020 | Rasovsky ........... G06F 21/6245 |
| 2021/0034733 A1 | 2/2021 | Grobelny et al. |

FOREIGN PATENT DOCUMENTS

| | | |
|---|---|---|
| KR | 10-1772314 B1 | 9/2017 |
| WO | WO 2010/030157 A1 | 3/2010 |
| WO | WO 2019/023289 A1 | 1/2019 |

OTHER PUBLICATIONS

U.S. Appl. No. 16/832,216, filed Mar. 27, 2020, Staab et al.
Response to U.S. Non-Final Office Action dated Dec. 3, 2020 for U.S. Appl. No. 16/371,191; Response filed Feb. 23, 2021; 8 pages.
U.S. Final Office Action dated Mar. 16, 2021 for U.S. Appl. No. 16/371,191.
Non-Final Office Action dated Apr. 29, 2021 for U.S. Appl. No. 16/398,641; 38 Pages.
PCT International Preliminary Report dated Mar. 18, 2021 for International Application No. PCT/US2019/045607; 7 pages.
PCT International Preliminary Report dated Mar. 18, 2021 for International Application No. PCT/US2019/045610; 7 pages.
PCT International Preliminary Report dated Mar. 18, 2021 for International Application No. PCT/US2019/045608; 11 pages.
PCT International Search Report and Written Opinion dated Aug. 11, 2020 for International Application No. PCT/US2019/045607; 12 Pages.
U.S. Notice of Allowance dated Aug. 24, 2020 for U.S. Appl. No. 16/214,857; 7 Pages.
U.S. Non-Final Office Action dated May 14, 2020 for U.S. Appl. No. 16/214,857; 23 Pages.
PCT International Search Report and Written Opinion dated Jun. 26, 2020 for International Application No. PCT/US2019/045608; 16 Pages.
PCT International Search Report and Written Opinion dated Jun. 25, 2020 for International Application No. PCT/US2020/025178; 12 Pages.
PCT International Search Report and Written Opinion dated Jul. 13, 2020 for International Application No. PCT/US2020/025195; 12 Pages.
PCT International Search Report and Written Opinion dated Jul. 14, 2020 for International Application No. PCT/US2019/045610; 12 Pages.
Response to U.S. Non-Final Office Action dated May 14, 2020 for U.S. Appl. No. 16/214,857; Response filed Jul. 30, 2020; 7 Pages.
PCT International Search Report and Written Opinion dated May 31, 2019 for International Application No. PCT/US2019/022879; 16 Pages.
Cooper et al., "BIOS Protection Guidelines," *National Institute of Standards and Technology*—Special Publication 800-147; U.S. Department of Commerce; Apr. 2011; 26 Pages.
Lohrke et al., "No Place to Hide: Contactless Probing of Secret Data on FPGAs;" Conference Paper from International Conference on Cryptographic Hardware and Embedded Systems (CHES 2016); Aug. 4, 2016; pp. 147-167; 21 Pages.
Regenscheid et al., "BIOS Integrity Measurement Guidelines (Draft);" *National Institute of Standards and Technology*—Special Publication 800-155; U.S. Department of Commerce; Dec. 2011; 47 Pages.
Regenscheid, "BIOS Protection Guidelines for Servers;" *National Institute of Standards and Technology*—NIST Special Publication 800-147B; U.S. Department of Commerce; Aug. 2014; 32 Pages.
Trusted Computing Group, "Trusted Platform Module Library, Part 1: Architecture;" Family "2.0", Level 00, Revision 01.16; TCG Published; Oct. 30, 2014; 147 Pages (Part 1 of 2).
Trusted Computing Group, "Trusted Platform Module Library, Part 1: Architecture;" Family "2.0", Level 00, Revision 01.16; TCG Published; Oct. 30, 2014; 121 Pages (Part 2 of 2).
Wilkins et al., "UEFI Secure Boot in Modern Computer Security Solutions;" www.UEFI.org; Sep. 2013; 10 Pages.
U.S. Non-Final Office Action dated Dec. 3, 2020 for U.S. Appl. No. 16/371,191; 18 Pages.
Notice of Allowance dated Nov. 12, 2021 for U.S. Appl. No. 16/255,917; 13 Pages.
U.S. Non-Final Office Action dated Jan. 26, 2021 for U.S. Appl. No. 16/255,917; 26 pages.

(56) References Cited

OTHER PUBLICATIONS

Non-Final Office Action dated Mar. 4, 2022 for U.S. Appl. No. 16/832,216; 11 Pages.
Response to U.S. Final Office Action dated Mar. 16, 2021 for U.S. Appl. No. 16/371,191; Response filed Jun. 15, 2021; 11 pages.
Response to U.S. Non-Final Office Action dated Jan. 26, 2021 for U.S. Appl. No. 16/255,917; Response filed Mar. 23, 2021; 7 pages.
PCT International Preliminary Report dated Oct. 22, 2020 for International Application No. PCT/US2019/022879; 9 Pages.
U.S. Non-Final Office Action dated Jul. 2, 2021 for U.S. Appl. No. 16/255,917; 21 pages.
Response to U.S. Non-Final Office Action dated Apr. 29, 2021 for U.S. Appl. No. 16/398,641; Response filed Jul. 23, 2021; 10 pages.
Office Action dated Dec. 27, 2021 for U.S. Appl. No. 16/371,191; 17 Pages.
U.S. Non-Final Office Action dated Jun. 30, 2021 for U.S. Appl. No. 16/371,191; 16 pages.
U.S. Notice of Allowance dated Mar. 30, 2022 for U.S. Appl. No. 16/722,142; 12 Pages.
Response filed May 31, 2022 to Non-Final Office Action dated Mar. 4, 2022 for U.S. Appl. No. 16/832,216; 9 Pages.
Notice of Allowance dated Aug. 13, 2021 for U.S. Appl. No. 16/398,641; 12 Pages.
Notice of Allowance dated Sep. 28, 2022 for U.S. Appl. No. 16/832,216; 15 Pages.
Response to Non-Final Office Action filed Sep. 27, 2021 for U.S. Appl. No. 16/371,191; 11 Pages.
Response to Non-Final Office Action filed Sep. 29, 2021 for U.S. Appl. No. 16/255,917; 8 Pages.
International Preliminary Report on Patentability dated Oct. 14, 2021 for PCT Application No. PCT/US2020/025195; 7 Pages.
International Preliminary Report on Patentability dated Oct. 14, 2021 for PCT Application No. PCT/US2020/025178; 7 Pages.

\* cited by examiner

ADAPTIVE, MULTI-LAYER ENTERPRISE DATA PROTECTION AND RESILIENCY PLATFORM

CROSS REFERENCE TO RELATED APPLICATIONS

The present application claims the benefit of U.S. Provisional Patent Application No. 62/827,441, filed on Apr. 1, 2019, which is incorporated herein by reference.

TECHNICAL FIELD

The concepts, systems, circuits, devices and techniques described herein relate generally to security systems and more particularly to security systems providing security monitoring and data protection.

BACKGROUND

Protecting data and ensuring data integrity and resiliency in enterprise environments provides numerous technical and non-technical challenges. For example, the level of trust placed in users, system administrators, applications, and underlying IT infrastructure varies widely and may change at any point in time. Providing continuous, cross-platform data protection against emerging and advanced, persistent threats requires a holistic approach that leverages advanced user and infrastructure monitoring, as well as multi-level data protection technologies.

There are several data protection and trust platforms on the market from providers, for example Ionic, Bear Systems, and Micro Focus. These approaches may have limitations in that the approaches assume that the underlying IT infrastructure and operating systems will maintain not having a security risk. Furthermore, these approaches do not provide multi-layer protection of data, which limits their ability to respond to certain threats. Some data protection products focus on securing specific data flows, which addresses only certain phases of the data life cycle.

SUMMARY

In accordance with the concepts, techniques and systems described herein is an efficient method for providing a secure data protection process. The techniques and systems described herein may provide a flexible, modular, highly adaptive enterprise data protection and resiliency platform. The platform couples distributed hardware- and/or software-based Root of Trust technologies (RoT) with multi-dimensional data binding and multi-layer, multi-domain (user, apps, systems, network, and storage) real-time monitoring, data fusion, and/or machine-learning-powered anomaly detection.

In one aspect, a system for data protection comprises: a first computing device comprising a security module; and a storage device coupled to the first computing device, wherein the security module comprises a Root of Trust (RoT), wherein the security module is configured to: establish a trust channel between the first computing device and the storage device; establish multi-dimensional data access control by binding data access and permissions to the first computing device for users, applications, system services, networks, locations, and access time windows; monitor the first computing device and the storage device; and take over control of the storage device in response to detection of a security risk to the system.

A system can further include one or more of the following features: the security module comprises at least one of a Software-based Root of Trust (SRoT) or a Hardware Root of Trust (HRoT), the first computing device further comprises a third-party agent configured to communicate to one or more third-party applications, which include an insider threat detection application, a data loss prevention application, a system and/or network intrusion detection application, and/or a user behavior analysis application, the system further comprises a second computing device, wherein the security module uses resources from the first computing device and the second computing device, the security module establishes the trust channel based on permissioned blockchain technology, the security module autonomously takes over control of the storage device in response to detection of a security risk to the system, the RoT prevents access to application, storage, network, and system resources on associated computing devices in response to detection of the security risk to the system, the HRoT and SRoT work together to monitor user, system, application, storage media, and network access behaviors and activities of the system, the SRoT monitors the HRoT and the HRoT monitors the SRoT, the RoT uses a permissioned Blockchain to log transactions, securely share secrets, establish consensus, confirm system critical operations, and extend trust in the system, the storage device comprises one of a local data storage, external data storage, or a cloud-based storage service, and/or the security risk comprises a suspicious or unauthorized data access from a remote device or from inside of the first computing device.

In another aspect, a method of data protection comprises: employing a first computing device comprising a security module; and employing a storage device coupled to the first computing device, wherein the security module comprises a Root of Trust (RoT), wherein the security module performs the steps of: establishing a trust channel between the first computing device and the storage device; establishing multi-dimensional data access control by binding data access and permissions to the first computing device for users, applications, system services, networks, locations, and access time windows; monitoring the first computing device and the storage device; and taking over control of the storage device in response to detection of a security risk to the system.

A method can further include one or more of the following features: the security module comprises at least one of a Software-based Root of Trust (SRoT) or a Hardware Root of Trust (HRoT), the first computing device further comprises a third-party agent configured to communicate to one or more third-party applications, which include an insider threat detection application, a data loss prevention application, a system and/or network intrusion detection application, and/or a user behavior analysis application, the system further comprises a second computing device, wherein the security module uses resources from the first computing device and the second computing device, the security module establishes the trust channel based on permissioned blockchain technology, the security module autonomously takes over control of the storage device in response to detection of a security risk to the system, and/or the RoT prevents access to application, storage, network, and system resources on associated computing devices in response to detection of the security risk to the system.

In a further aspect, a system for data protection comprises: a first computing means comprising a security module; and a storage means coupled to the first computing means, wherein the security module comprises a Root of Trust (RoT), wherein the security module is configured to: establish a trust channel between the first computing means and the storage means; establish multi-dimensional data access control by binding data access and permissions to the first computing means for users, applications, system services, networks, locations, and access time windows; monitor the first computing means and the storage means; and take over control of the storage means in response to detection of a security risk to the system.

The details of one or more embodiments of the disclosure are outlined in the accompanying drawings and the description below. Other features, objects, and advantages of the disclosure will be apparent from the description and drawings, and from the claims.

BRIEF DESCRIPTION OF THE DRAWINGS

The foregoing features may be more fully understood from the following description of the drawings in which.

DETAILED DESCRIPTION

Relative descriptions used herein, such as left, right, up, and down, are with reference to the figures, are merely relative and not meant in a limiting sense. Additionally, for clarity, common items and circuitry, such as integrated circuits, resistors, capacitors, transistors, and the like, have not been included in the figures, as can be appreciated by those of ordinary skill in the pertinent art. Unless otherwise specified, the illustrated embodiments may be understood as providing illustrative features of varying detail of certain embodiments, and therefore, unless otherwise specified, features, components, modules, elements, and/or aspects of the illustrations can be otherwise combined, interconnected, sequenced, separated, interchanged, positioned, and/or rearranged without materially departing from the disclosed concepts, systems, or methods. Additionally, the shapes and sizes of components are intended to be only illustrative and unless otherwise specified, can be altered without materially affecting or limiting the scope of the concepts sought to be protected herein.

Certain introductory concepts and terms used in the specification are provided below.

As used herein, the term "Root of Trust (RoT)" is used to describe a trusted computing module that provides a set of functions that are trusted by other modules in a computing environment, such as an Operating System (OS). The RoT may serve as an independent computing module providing authenticity in a computer or mobile device in which it is embedded. The term "Hardware Root of Trust (HRoT)" device is used to describe a hardware device that provides RoT functions. The HRoT device generally provides, but is not limited to, performing device authentication to ensure that hardware has not been tampered with; verifying the authenticity of software, particularly boot images, to ensure they haven't been tampered with; providing One-Time Programmable (OTP) memory for secure key storage to facilitate encryption; and ensuring that the system is able to be brought into a known and trusted state.

As used herein, the term "Self-Encrypting Drive (SED)" is used to describe a storage device, such as a hard drive or a solid state drive, that comprises a circuit built into a controller module of the storage device such that the controller module encrypts all data to the magnetic or flash memory media and decrypts all the data from the media automatically without interacting with an external device. The technology is also referred to as "Hardware-based Full Disk Encryption (FDE)."

As used herein, the term "Trusted Platform Module (TPM)" is used to describe a specialized device for hardware authentication. The TPM comprises a dedicated microcontroller that provides secure storage, key generation, and cryptographic operations.

Figure 1:
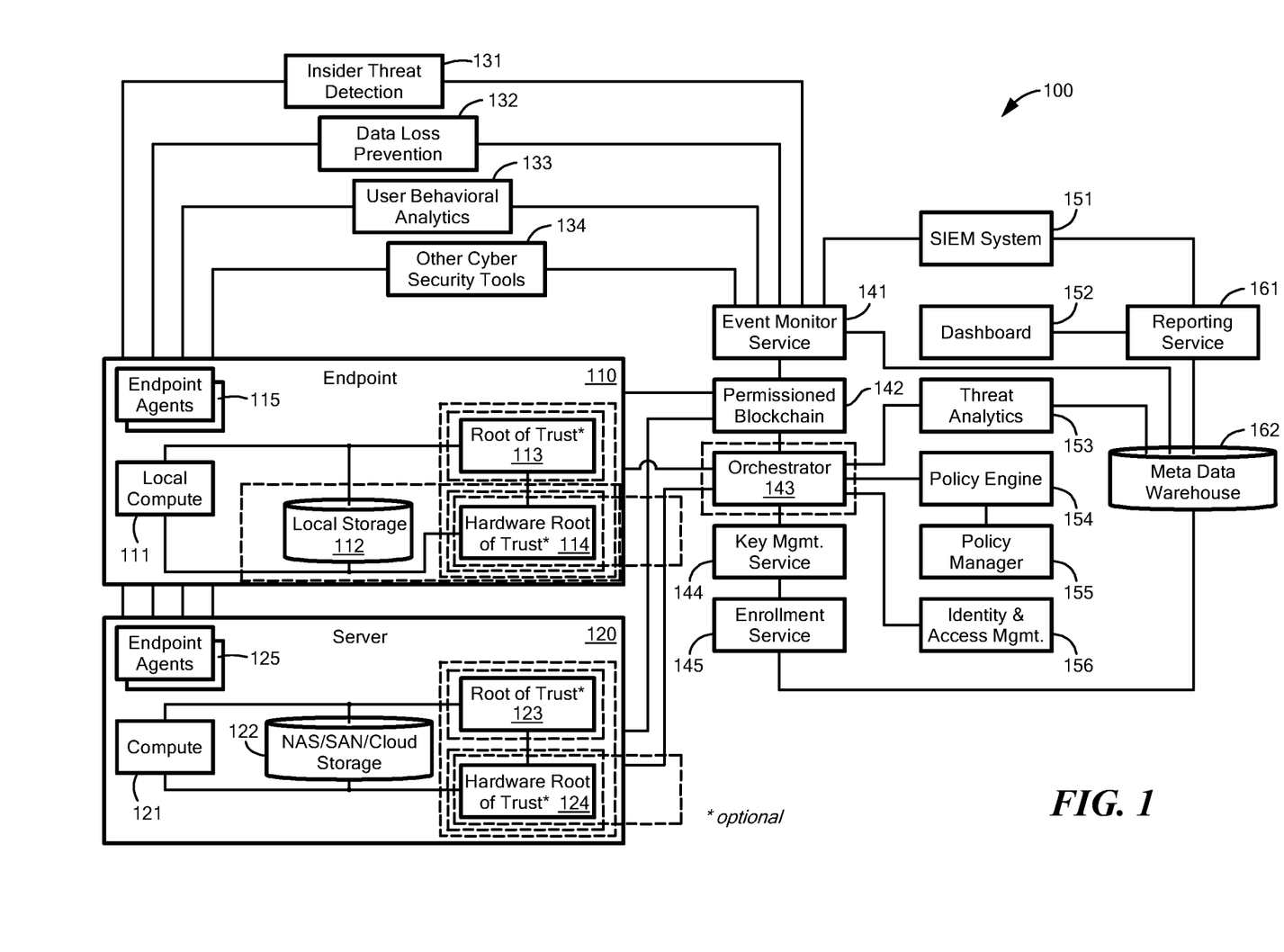
FIG. 1 is a block diagram of an illustrative platform for data protection and resiliency according to the concepts described herein.

Referring now to FIG. 1, a platform 100 providing data protection and resiliency may comprise one or more computing devices, such as endpoints 110 (e.g., desktops, laptops, tablets, mobile devices) and/or one or more servers 120 (e.g., enterprise servers, database servers, web servers, file servers, cloud servers). The platform 100 may comprise both endpoints and servers. Alternatively, the platform may comprise one endpoint or one server device. In embodiments, at least one of the one or more computing devices 110, 120 comprises a Root of Trust (RoT) component 113, 114, 123, 124. An RoT component included in the computing devices 110, 120 may comprise a Software RoT (RoT) 113, 123 and/or a Hardware RoT (HRoT) 114, 124. RoT and HRoT may provide the same or substantially similar functions for security control and data protection. Thus, the platform 100 may have only RoT or HRoT. In embodiments, using both of RoT 113, 123 and HRoT 114, 124 will increase the security level of the platform 100. The RoT 113, 123 work with the HRoT 114, 124 to allow for additional OS- and application-level integrity checks and cross-validation that is beyond the reach of the HRoT's monitoring capabilities. In embodiments, the HRoT 114, 124 and the RoT service may monitor integrity of the others. When the integrity of either the RoT 113, 123 or HRoT 114, 124 appears to be compromised, the surviving party could issue a predefined sequence of secure (self-defense) drive operations, such as issuing a system alert to a Security Incident & Event Management (SIEM) system and/or perform any other suitable actions to protect the system 100. Furthermore, a consensus voting process may be implemented between the RoT 113, 123 and HRoT 114, 124 for non-reversible transactions (e.g., secure deletion of files, folders, or entire storage media). The consensus voting process will require approvals from both of RoT 113, 123 and HRoT 114, 124, or other networked RoT or HRoT devices, which provides additional protection for the non-reversible transactions.

The endpoint 110 may include a local compute 111, local storage 112, and one or more agents 115. The local compute 111 provides a local computing environment. In embodiments, a Central Processing Unit (CPU) may provide the local computing environment. The one or more agents 115 are responsible for communicating with third-party applications 131, 132, 133, 134. The third-party applications may include, but are not limited to, an insider threat detection application 131, data loss prevention application 132, and/or user behavior analytics application 133. The agents 115 may also communicate with other cybersecurity tools 134. In embodiments, the local storage 112 may be replaced with a network mapped drive (i.e., network file system that is accessible by the endpoint device) or a mapped cloud-based storage device.

The server device 120 may have similar structure as the endpoint device. The server 120 may include local and NAS/SAN/Cloud storage 122 which can be shared with other computing devices (e.g., an endpoint 110). The server 120 may also include computing environment 121 that can be shared with other computing devices. The server 120 may further include RoT 123, HRoT 124, as described above, and one or more endpoint agents 125.

In embodiments, the HRoT 114, 124 that are included in the computing devices 110, 120 may include a hardware module that can be deployed in the computing devices 110, 120. In some embodiments, the HRoT 114, 124 may comprise a standalone device that is coupled to the computing devices 110, 120 via a channel that can provide a secure connection, such as a Peripheral Component Interconnect Express (PCIe) bus.

The platform 100 may include an orchestrator module 143 on one of the one or more computing devices 110, 120 or on a separate computing device (not shown). The orchestrator 143 may provide remote Command and Control (C2) functionalities, as well as remote health status monitoring and configuration management for network-attached HRoT devices and RoT instances.

The platform 100 may establish trust between the endpoints 110 and servers 120 via the use of Hardware Root of Trust (HRoT) 114, 124 and/or software-based Root of Trust (SRoT) technologies 113, 114. The integration of hardware and software-based RoT technologies allows the platform to tightly bind data to specific devices, users, applications, locations, networks, and access time windows. As a result, the disclosed platform 100 enables multi-dimensional data access control. These data bindings can be captured in the form of data protection policies via a Policy Management service and enforced by the platform's Policy Engine 154 that is managed by a Policy Manager 155. To counter impostors and allow for adaptive, risk-graded data access control, data from third-party monitoring systems such as data loss prevention 132, insider threat detection 131, user behavioral analytics systems 133, and other cybersecurity tools 134 can be incorporated at run time in the platform's data access decision making process via a third-party agent 115, 125. In embodiments, any other suitable behavioral analytics including, but not limited to, system-level, network, storage media, application, and data-level behavioral analytics may be utilized.

To provide an additional layer of hardware-based security at the storage media level, the platform provides a secure Command & Control (C2) channel between HRoT devices and attached, OPAL standard-compliant Self-Encrypting Drives (SEDs). This C2 capability, for example, allows authorized Security Operations Center (SOC) staff to securely and rapidly modify the behavior of individual drives (or entire drive arrays) by issuing commands to lock/unlock a drive, swap the drive's encryption key, enter a drive into decoy mode, or securely wipe it if needed. Given its sensitivity, this C2 interface may be protected through a transport layer security protocol, for example, as well as through a separate command payload encryption.

By locally or remotely loading local authenticated threat monitoring and inferencing code directly into the HRoT device's Trusted Execution Environment (TEE), the HRoT device 114 can not only be used to attest to the integrity of its host and attached peripherals, but it can also protect the locally attached storage media and applications without having to rely on a remote C2 system. By enabling the platform to concurrently operate in centralized and de-centralized data protection modes, edge-level data resiliency, system-level fault tolerance, and incident response times are further improved.

Through its multi-source Event Monitor 141, the platform is also able to listen and react to indicators of compromise from third-party-provided cybersecurity tools (e.g., insider threat 131, user behavioral analytics 133, data loss prevention tools 132) and attached Security Information & Event Management (STEM) 151 in real-time. Having access to externally and internally collected, user-, application-, operating system-, network-, and storage media-level events enables the platform's Threat Analytics engine 153 to learn non-obvious relationships; correlate user, application, network, storage media, and data access patterns; and detect anomalies that can't be detected by analyzing these activities stream in isolation.

The platform's Dashboard 152 provides visual feedback on the relevant platform- and third-party system-generated security events. It also basic provides health status and configuration information about enterprise-wide deployed HRoT device.

The platform's Enrollment Service 145 is used to enroll sensitive system components, such as HRoT devices, RoT software, approved firmware and machine images, and self-encrypting storage media. The Key Management Service 144 provides and manages encryption keys and digital certificates for enrolled entities. It can also provide encryption keys to applications and storage management solutions (e.g., Network Attached Storage (NAS), Storage Area Network (SAN), or Cloud Storage) to allow for file- and object-level encryption.

The Reporting Service 161 is used to share platform-generated security alerts with third-party systems, such as a STEM. It also feeds system events to the platform's Dashboard 152 for data visualization and situation awareness. The Reporting Service 161 may also provide data export and report generation capabilities.

The Policy Management 155 service allows operators to define systems-specific data binding and data access policies which are then enforced by the Policy Engine 154 and executed by the Orchestrator 143. If needed, operating system-provided policy management service can be tied in or leveraged.

Similar to the Policy Engine, the Identification & Access Management (IAM) service 156 can leverage already existing, enterprise- and cloud-deployed IAM services, such as Active Directory, Lightweight Directory Access Protocol (LDAP), Cloud-native IAM services, or a third-party-provided Cloud Security Access Broker (CASB).

The platform 100 may include a permissioned blockchain module 142. A "permissioned blockchain" maintains an access control layer to allow certain actions to be performed only by certain identifiable participants. Here the certain identifiable participants may be the computing device 110, 120 after a trust channel is established between the computing devices 110, 120 via RoT 113, 123 or HRoT 114, 124. The permissioned blockchain module 142 may serve multiple purposes. The permissioned blockchain module 142 may serve multiple purposes, which include, but are not limited to, extending trust from the distributed HRoT 114, 124 and RoT instances 113, 123 across local and wide area networks, validating ownership of sensitive data (e.g., a passphrase or key) without having to reveal it using zero knowledge proofs, sharing sensitive information securely, log transactions immutably (e.g., security incidents, changes in access privileges), proof of work (e.g., proof that firmware on an HRoT device was updated as requested), and establishing trust and consensus in an untrusted environment (e.g., verifying that a high-impact command like a secure wipe was legitimate before executing it).

In embodiments, the platform 100 may utilize other commercially available technologies to further improve protection of sensitive processing tasks. For example, the platform 100 may incorporate Intel SGX (Secure Guard Extension) to protect selected code and data from disclosure or modification. Accordingly, developers for the platform 100 may partition their application into processor-hardened enclaves (i.e., protected areas of execution in memory) that increase security, which may be protected even though the platform 100 is comprised by a security attack.

Advanced data protection is provided through a combination of distributed Roots of Trusts, self-encrypting storage, multi-level system monitoring, and Artificial Intelligence (AI). Example platform embodiments uniquely combine distributed software- and hardware-based Root of Trust technologies with traditional network, server, and endpoint monitoring capabilities (e.g., intrusion detection, insider threat detection, data loss prevention, and user behavioral analytics tools); standards-based, self-encrypting storage media access controls; multi-layer, multi-source data fusion and threat inferencing to provide real-time, cross-platform data access control and protection. The platform enables Root of Trust entities to rapidly take over control of storage media to stop data leakage or data corruption independent of the host system and a remote security operations center.

The platform provides multi-modal, multi-layer advanced threat detection. Concurrent access and mining of multi-source, user-, software- and hardware-level events allow a platform machine learning engine to spot non-obvious relationships and data access patterns that cannot be discerned by monitoring user behavior, application, network, or storage media activity independently. As a result, the probability of detecting advanced threats can be increased, while also reducing dwell and reaction times.

The platform supports the deployment of AI-powered, data access control-related decision making on edge devices (e.g., servers, desktop, laptops, tablets, or mobile devices). Depending on the sensitivity of the data they provide access to or host locally, edge devices can be equipped with an embedded or attached, cyber-hardened HRoT device can be used as cyber sensors and actuators. The highly secure, trusted execution environment inside these HRoT devices can be used to run AI-powered threat classifiers outside of their host system, providing an additional layer of protection. Upon detection a local threat (or an external trigger), the HRoT-hosted decision engine could autonomously enter its host system into self-defense mode and execute a pre-authorized or dynamically generated playbook. The scripted or dynamically generated response could trigger a number of HRoT-initiated actions, such as locking down attached storage media instantly; changing the drive keys of attached SED media; securely wiping specific files, folders, or entire drives; or setting specific drives or folders into decoy mode. The concepts described above extend to HRoT-equipped servers as well. Allowing trusted system components to make certain, data protection-related decisions without having to rely on a centralized authority (which could have been disabled or compromised) has the potential to significantly increase an organization's data protection capabilities and resiliency as it reduces a single point of failure.

Dynamic trust extension and secure information sharing can be provided via permissioned Blockchain. To further improve data protection, resiliency, and availability, an optional Blockchain-based distributed ledger system can be added to allow for distributed, secure, immutable transaction logging; extending trust from the hardware- and software root of trust entities to applications and users; sharing of sensitive information across networks and sites (e.g., software updates, access control lists); and consensus building in untrusted environments.

Multi-dimensional, multi-factor, and adaptive data access control can also be provided. Platform allows tight binding of data to specific devices, users, operating systems, networks, applications, physical locations, and access times. By incorporating real-time data and insights (e.g., real-time user- or machine-level risk scores) from complimentary, third-party data protection systems (e.g., host OS's native security services, insider threat detection, data loss prevention, user behavioral analytics tools), the platform can further optimize its data access decision making and proactively adjust data access policies on the fly. This multi-layered, multi-dimensional, real-time feedback loop allows the platform to continuously adapt and properly respond in a risk-appropriate manner.

Figure 2:
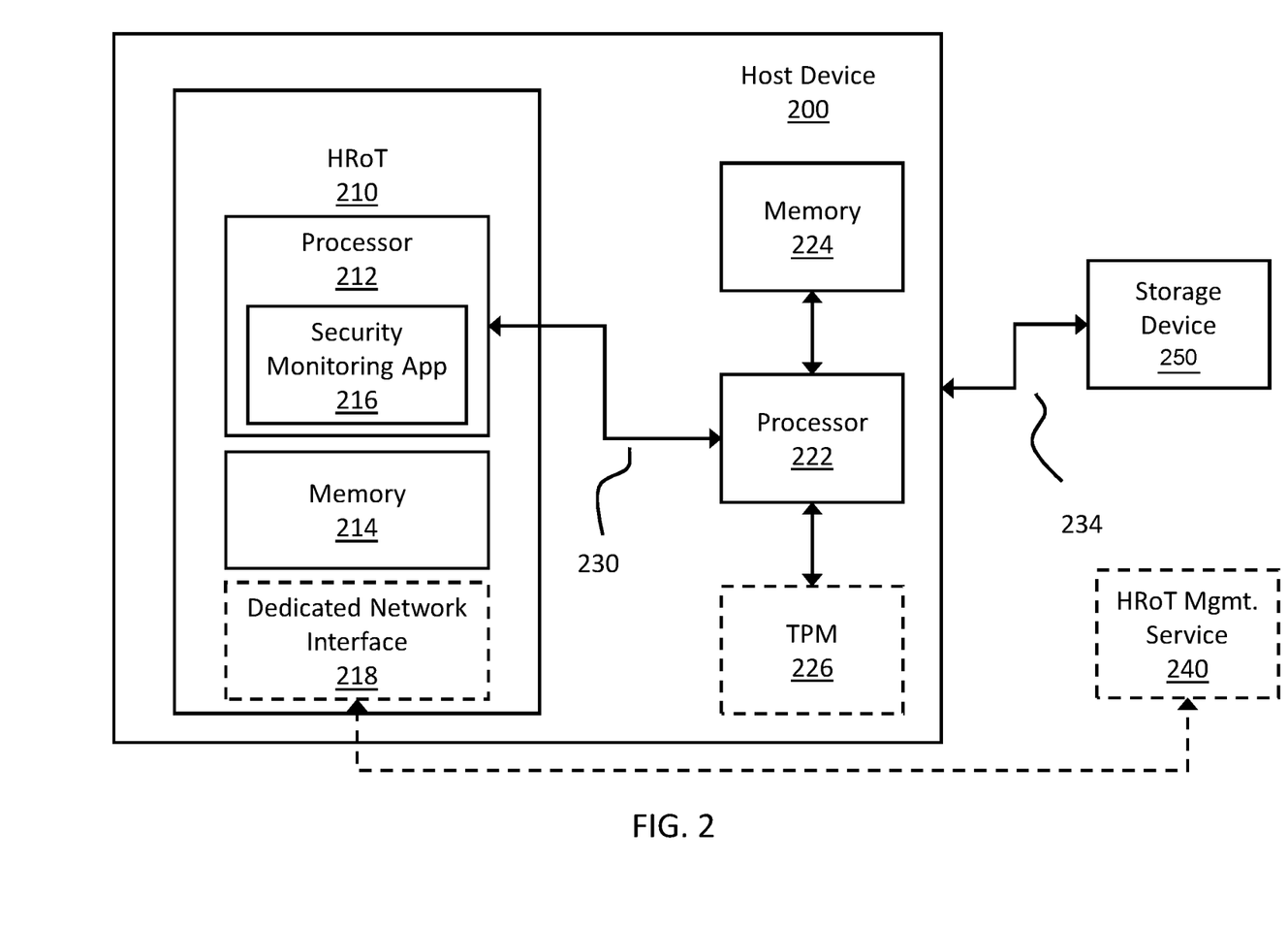
FIG. 2 is a block diagram showing an architecture of a Hardware Root of Trust (HRoT) according to the concepts described herein.

Referring now to FIG. 2, an illustrative host device 200 (e.g., endpoint 110 and server 120 in FIG. 1) may include a Hardware Root of Trust (HRoT) device 210. The HRoT 210 may include a multi-core processor 212, a memory 214, and an optional dedicated network interface controller 218. The host device 200 may include a central processing unit (CPU) 222, TPM device 226, and memory 224 in addition to the HRoT 210. The HRoT 210 may be connected to the CPU 222 via a connection interface 230.

The HRoT device 210 comprises a security device that provides a set of functions that are trusted by other modules in a computing environment. The processor 212 of the HRoT device 210 may include one or more cores (not shown). The processor 212 may also include a boot read-only memory (ROM), on-chip memory, and programmable logic (PL). A processor (e.g., 212) of an HRoT device generally requires higher security features than a typical processor being used in a system that does not require higher security.

In embodiments, the HRoT device 210 may load and execute a security monitoring application 216. The security monitoring application 216 may provide a 'tamper detection mechanism' by intercepting events such as voltage changes, clock skewing, and/or Joint Test Action Group (JTAG) connection for example. In an embodiment, the JTAG connection connects to an on-chip test access port (TAP) of a chip and may access a set of test registers to test various parts of the chip and detect issues with the chip, for example, a circuit fault. The security monitoring application may also monitor inputs and outputs to/from the system. The security monitoring application validates the current state of the hardware (e.g., the host device 200), and upon successful validation of the hardware, boot sequence of the hardware may continue.

In embodiments, the connection interface 230 may comprise a secure connection. In other embodiments, the connection interface 230 comprises a PCIe bus, which provides Direct Memory Access (DMA) capability. Accordingly, the HRoT 210 may access the memory 214 directly to validate and authenticate the host device 200. The HRoT 210 may also communicate with the TPM 226, which is an optional component of the host device 200. The security monitoring application 216 that is loaded and executed in the HRoT 210 may communicate to the TPM through the connection interface 230. In addition, the security monitoring application may conduct periodic handshakes with the TPM 226 to continually monitor both the hardware and software security of the system.

In embodiments, the HRoT 210 may include its own, dedicated network interface controller (NIC) 218, which allows setting up a dedicated, secure, and isolated network used exclusively for security-related communications between the HRoT devices 114, 124 and a centralized HRoT device management service 240 (equal to or substantially similar with orchestrator 143 in FIG. 1). This additional network interface may be used by the centralized HRoT device management service 240 to perform functions including, but are not limited to, performing health checks on HRoT devices, deploying firmware updates to HRoT devices, securely exchanging and/or rotating encryption keys for attached storage media outside the host OS the host machine's regular network interface and network connection. This optional, parallel, and isolated network interface 218 for security-related operations may provide network redundancy to the HRoT 210, which increases its safety level. The dedicated network interface 218 may also provide another level of protection in case the regular network interface of the host device 200 or the network that the host device 200 is connected to has been compromised or is suspicious to have a security risk. Since this HRoT is not accessible (and not visible) by the host device and only accessible via the HRoT device's trusted execution environment (TEE), this isolated (out-of-band) security network reduces risk of attack from outside the chance of message intercept or manipulation that could occur if the HRoT had to solely rely on the regular network interface of its host machine to receive security-related instructions and taskings. In embodiments, a platform for data protection and resiliency (e.g., the system 100 in FIG. 1) may support these types of optional, parallel, HRoT-connected security networks to improve overall security, data protection, and system resiliency. In embodiments, the system may respond to both internally observed security threat and externally observed security threat. In embodiments, the security threat (and related events) may be generated by host system-resident, enterprise-level security monitoring services, and/or the HRoT device.

The host device 200 may be coupled to a storage device 250 via a connection interface 234. The HRoT 210 of the host device 200 may monitor communication of the storage device 250 through the connection interface 234. When it is determined that there is a security risk with the host device 200 and/or the storage device 250, the HRoT 210 may take over the control of the storage device 250 to protect data stored in the storage device 250. In embodiments, the storage device 250 comprises one of a local data storage, external data storage, or a cloud-based storage service. External data storage may include, for example, distributed (external) components which may not be collocated on the same platform as other components. In embodiments, the storage device 250 may be a cloud-based storage service, such as Amazon Simple Storage Services (Amazon S3). In addition, the HRoT 210 may control data hosted on the cloud-based storage device. For example, the HRoT device 210 could be included into a server that runs an enterprise's Cloud Access & Security Broker (CASB) software. When a threat is detected on the CASB server, the HRoT device 210 may trigger a lockdown of cloud-hosted data and prevent its data access. In embodiments, the HRoT device 210 may be allowed to connect to the cloud service provider's (e.g., Amazon Web Services) Identity & Access Management service, which allow the HRoT 210 may change cloud folder or object access rights, or selectively revoke access for specific users or applications.

The features described above in conjunction with FIG. 2 are based upon an HRoT module 210. As can be appreciated by a person in the pertinent art, substantially similar or the same features may be provided by a software-based RoT instance running on the host device 200.

Figure 3:
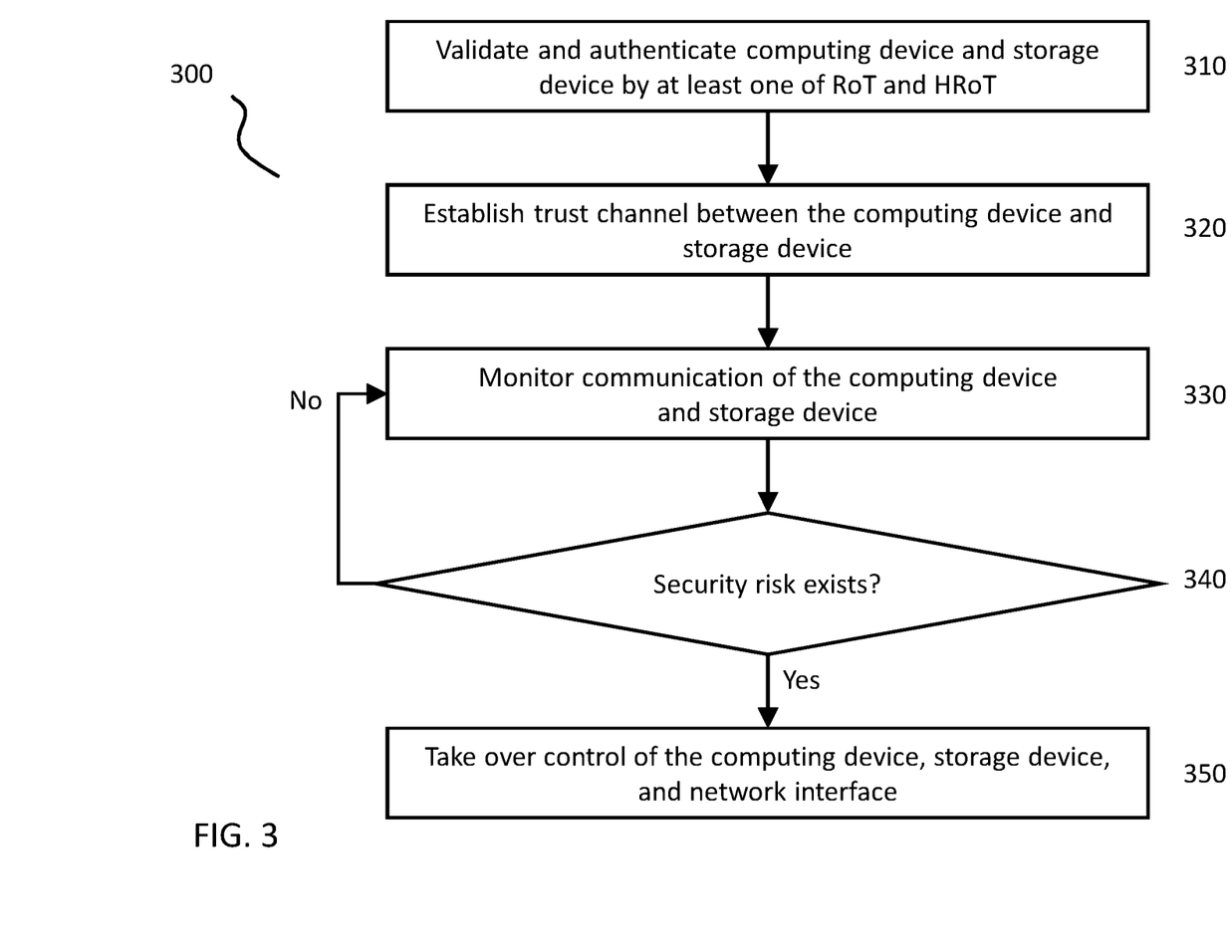
FIG. 3 is a flowchart of a process for data protection according to the concepts described herein.

FIG. 3 is a flow diagram illustrating the processing performed by a system (e.g., the system 100 shown and described above in conjunction with FIG. 1). Rectangular elements (typified by element 310 in FIG. 3), herein denoted "processing blocks," represent computer software instructions or groups of instructions and diamond shaped elements (typified by element 340 in FIG. 3), herein denoted decision blocks represent computer software instructions or groups of instructions which affect the flow of the processing blocks. The processing blocks may represent steps performed by functionally equivalent circuits such as a digital signal processor (DSP) circuit or an application specific integrated circuit (ASIC). The flow diagrams do not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

Referring now to FIG. 3, a process 300 for monitoring security and protecting data includes processing block 310 in which at least one of Software-based Root of Trust (SRoT) instance (e.g., RoT 113 in FIG. 1) and Hardware Root of Trust (HRoT) module (e.g., HRoT 114 in FIG. 1) validate and authenticate a computing device (e.g., host device 200 in FIG. 2) and a storage device (e.g., storage device 250 in FIG. 2). In embodiments, the RoT/HRoT validate the computing device and the storage device, for example, using a tamper detection mechanism which is described above in conjunction with FIG. 2. When it is determined that there is no security risk with the computing device and storage device, the RoT/HRoT authenticates the computing device and storage device. Processing may then proceed to processing block 320, in which the RoT/HRoT establishes a trust channel between the computing device and storage device. Then, the computing device and storage device may start communicating to each other. Processing may then proceed to processing block 330, in which the RoT/HRoT monitors communication of the computing device and storage device. In embodiments, the RoT/HRoT monitors data received by and sent from the computing device and storage device. The RoT/HRoT may monitor the physical state of the computing device and storage device using the tamper detection mechanism described above. In other embodiments, the RoT/HRoT may utilize any other suitable methods to monitor the security of the computing device and storage device, which could include network activity monitoring.

In decision block 340, the RoT/HRoT determines whether there is a security risk to the computing device and storage device. If, in decision block 340, it is determined that there is a security risk, processing may proceed to processing block 350, in which the RoT/HRoT takes over the control of the storage device to protect data stored in the storage device. In embodiments, the RoT/HRoT may take over the control of the computing device in which the RoT/HRoT operates to defend against a security attack. If, in decision block 340, it is determined that there is no security risk, processing may proceed to processing block 330 in which the RoT/HRoT continues monitoring of the computing device and the storage device.

In embodiments there can be a variety of criteria for identifying security risks. For example, in a ransomware attack there may be detection of above normal storage media I/O access patterns, e.g., ransomware process starting to encrypt the entire drive. In addition, there may be an insider trying to access storage media outside regular business hours. Also, security risk may be identified by modification of storage device driver software or controller firmware. In example embodiments, a security risk can be identified by the modification of any critical software on the system. In embodiments, as part of a provisioning process and/or platform configuration settings, a HRoT device can securely hash and store all kinds of host system- and HRoT-related configuration meta data (e.g., BIOS, Firmware, Host OS, and host application versions, etc.) in its secure onboard storage, which it then can use to periodically validate system integrity at run-time. Any deviations from the expected baseline configuration can be interpreted as a security risk, which may cause the HRoT to auto-lock all storage systems. This behavior would be configurable and depend on the use case scenario(s).

In embodiments, the platform (e.g., 100 in FIG. 1) may take over the control of the endpoint's or server's network access (e.g., to prevent data exfiltration or unauthorized access to a mounted network files system or cloud storage service) via the RoT/HRoT and kernel-level driver access, the platform can also take over control. Additionally, the RoT/HRoT may take over control of the entire host OS, shutdown specific applications and services (e.g., stop print service), reboot the machine, take it entirely off the network, or prevent it from booting up. That is, the RoT/HRoT has the capability to take over full control the endpoint (e.g., 110 in FIG. 1) or server (e.g., 120).

In embodiments, the HRoT and the SwRoT perform independent software- and hardware-level monitoring tasks in parallel and also monitor each other (essentially forming a kind of a buddy system). So if the HRoT gets removed, tampered with, or has a hardware failure, the SWRoT can detect it (due to its period health checks with the HRoT device and vice versa) and take protective measures. The HWRoT can detect if something happened to the SWRoT and take actions (e.g., lock down the storage media, perform a secure wipe, etc.).

Figure 4:
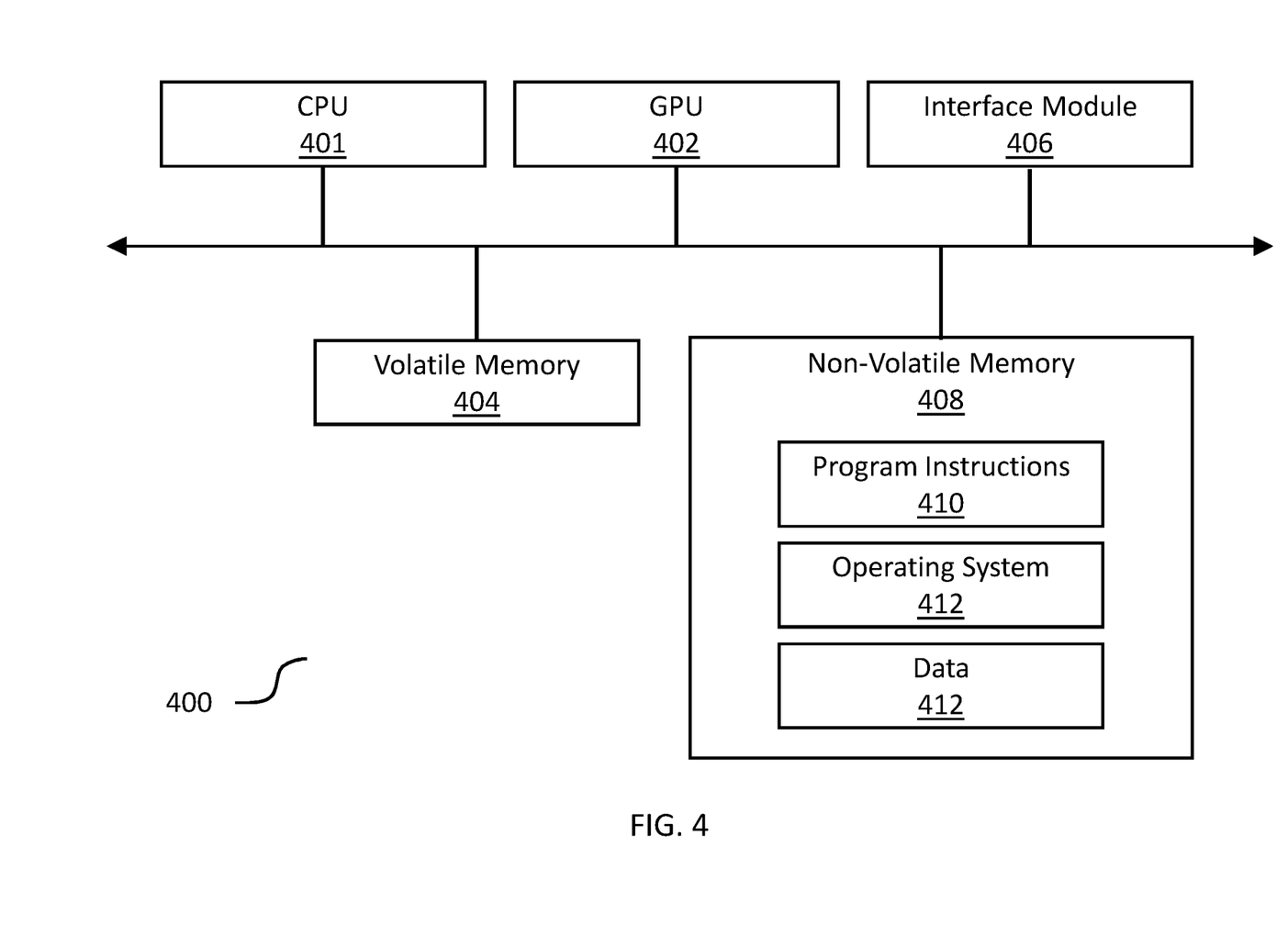
FIG. 4 is an illustrative implementation of a security system described in FIG. 1 according to the concepts described herein.

Referring now to FIG. 4, an illustrative implementation of a processing device 400 which may be suitable to implement the processing techniques described herein includes a processor 402, a volatile memory 404, a non-volatile memory 408 (e.g., hard disk, flash memory) and the interface module 408 (e.g., a user interface, USB interface and so forth). The non-volatile memory 408 stores computer instructions 412, an operating system 418 and data 418. In one example, the computer instructions 412 are executed by the processor 402 out of volatile memory 404 to perform all or part of the processes described herein (e.g., processes 300).

The processes described herein (e.g., process 300) is not limited to use with hardware and software of FIGS. 1-2; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or another article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers). Each such program may be implemented in a high-level procedural, functional, or object-oriented programming language to work with the rest of the computer-based system. However, the programs may be implemented in assembly, machine language, or Hardware Description Language. The language may be a compiled or an interpreted language, and it may be deployed in any form, including as a stand-alone program or as a module, component, subroutine, or another unit suitable for use in a computing environment. A computer program may be deployed to be executed on one computer or multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The inventive concepts of Root of Trust (RoT) technology, including a Software-based RoT (SRoT) and Hardware-based RoT (HRoT), may provide a system and application level attestation and integrity checks of the host system. The RoT may be embedded into the host OS's kernel space at a lower level, the RoT can take over control of the entire host operating system including, but is not limited to, enable/disable OS system services, stop or start applications and OS services, such as print and network services, keyboard entry, cause a system reboot, prevent the system from booting, stop network and printer access. By working in concert with a SRoT & system monitoring service, the HRoT may expand its capability and can task the SRoT to perform operations including, but are not limited to, taking the host machine off the network or terminating a process (e.g., a ransomware process that started to encrypt data on the local or remote storage devices) on the host machine. Accordingly, the SRoT can extend the reach, capabilities, and effectiveness of the HRoT device by working together with the HRoT.

Having described preferred embodiments, which serve to illustrate various concepts, structures and techniques, which are the subject of this patent, it will now become apparent that other embodiments incorporating these concepts, structures and techniques may be used. Accordingly, it is submitted that the scope of the patent should not be limited to the described embodiments but rather should be limited only by the spirit and scope of the following claims.

Accordingly, other embodiments are within the scope of the following claims.

What is claimed is:

1. A system for data protection, the system comprising::
a first computing device comprising a security module; and
a storage device coupled to the first computing device,
wherein the security module comprises a Software-based Root of Trust (SRoT) and a Hardware Root of Trust (HRoT), the SRoT and the HRoT perform independent software-level and hardware-level monitoring tasks in parallel,
wherein the security module is configured to:
    establish a trust channel between the first computing device and the storage device, the trust channel based on a permissioned blockchain defining allowable actions by the first computing device;
    establish data access policies which define multi-dimensional data access;
    adjust the data access policies based on real-time risk scores;
    monitor communication of the first computing device and the storage device; and
    take over control of the storage device in response to detection of a security risk to the system.

2. The system of claim 1, wherein the first computing device further comprises a third-party agent configured to communicate to one or more third-party applications, which include an insider threat detection application, a data loss prevention application, a system and/or network intrusion detection application, and/or a user behavior analysis application.

3. The system of claim 1, the security module autonomously takes over control of the storage device in response to detection of a security risk to the system.

4. The system of claim 1, wherein the security module prevents access to application, storage, network, and system resources on associated computing devices in response to detection of the security risk to the system.

5. The system of claim 1, wherein the HRoT and SRoT work together to monitor user, system, application, storage media, and network access behaviors and activities of the system.

6. The system of claim 1, wherein the SRoT monitors the HRoT and the HRoT monitors the SRoT.

7. The system of claim 1, wherein the permissioned Blockchain being used to log transactions, securely share secrets, establish consensus, confirm system critical operations, and extend trust in the system.

8. The system of claim 1, wherein the storage device comprises one of a local data storage, external data storage, or a cloud-based storage service.

9. The system of claim 1, wherein the security risk comprises a suspicious or unauthorized data access from a remote device or from inside of the first computing device.

10. A method of data protection, comprising:
employing a first computing device comprising a security module; and
employing a storage device coupled to the first computing device, wherein the security module comprises a Software-based Root of Trust (SRoT) and a Hardware Root of Trust (HRoT), the SRoT and the HRoT perform independent software-level and hardware-level monitoring tasks in parallel, wherein the security module performs the steps of:
    establishing a trust channel between the first computing device and the storage device, the trust channel based on a permissioned blockchain defining allowable actions by the first computing device;
    establishing data access policies which define multi-dimensional data access permissions;
    adjusting the data access policies based on real-time risk scores;
    monitoring communication of the first computing device and the storage device; and
    taking over control of the storage device in response to detection of a security risk to the system.

11. The method of claim 10, wherein the first computing device further comprises a third-party agent configured to communicate to one or more third-party applications, which include an insider threat detection application, a data loss prevention application, a system and/or network intrusion detection application, and/or a user behavior analysis application.

12. The method of claim 10, wherein the security module autonomously takes over control of the storage device in response to detection of a security risk to the system.

13. The method of claim 10, wherein the security module prevents access to application, storage, network, and system resources on associated computing devices in response to detection of the security risk to the system.

14. A system for data protection, the system comprising:
a first computing means comprising a security module; and
a storage means coupled to the first computing means,
wherein the security module comprises Software-based Root of Trust (SRoT) and a Hardware Root of Trust (HRoT, the SRoT and the HRoT perform independent software-level and hardware-level monitoring tasks in parallel,
wherein the security module is configured to:
    establish a trust channel between the first computing means and the storage means, the trust channel based on a permissioned blockchain defining allowable actions by the first computing device;
    establish data access policies which define multi-dimensional data access perm issions;
    adjusting the data access policies based on real-time risk scores;
    monitor communication of the first computing means and the storage means; and
    take over control of the storage means in response to detection of a security risk to the system.

* * * * *